E. DUFFEE.

Improvement in Gas Purifier Screens.

No. 130,199.  Patented Aug. 6, 1872.

Witnesses.  
Geo Gray  
F. C. Hale

Edward Duffee  
by his attorney.  
J. P. Hale

UNITED STATES PATENT OFFICE.

EDWARD DUFFEE, OF HAVERHILL, MASSACHUSETTS.

IMPROVEMENT IN GAS-PURIFIER SCREENS.

Specification forming part of Letters Patent No. 130,199, dated August 6, 1872.

*To all to whom it may concern:*

Be it known that I, EDWARD DUFFEE, of Haverhill, in the county of Essex and State of Massachusetts, have invented a new and useful "Improvement in Screens for Coal-Gas Purifiers;" and do hereby declare the same to be fully described in the following specification and represented in the accompanying drawing, of which—

Figure 1:
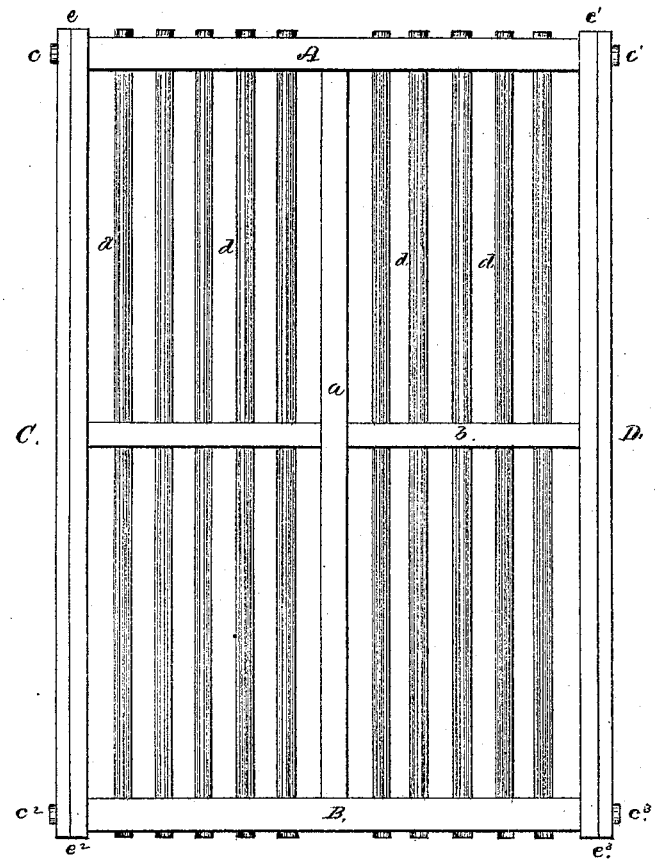
Figure 2:
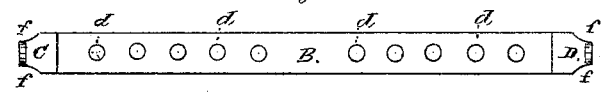

Figure 1 denotes a top view of a screen constructed in accordance with my invention, and Fig. 2 an end view thereof.

My invention may be said to be an improvement upon that patented by me on January 26, 1871, and consists, first, in dispensing with the thin strips of wood or rattan woven or interlaced in the form of basket-work, and employing in place thereof a series of independent cylindrical or other proper-shaped bars or rods extending across the frame, either longitudinally or transversely, each of the rods passing through holes made for its reception in the frame and extending beyond the outer face of the bars, each of the said rods being loosely fitted to the bars, so that it may be readily drawn out whenever necessary for repairs or otherwise; and, second, in forming the sides of the wooden frame with beveled edges, so that when two of the screens are placed in the box, and with their sides abutting, a wide wedge-shaped space shall be formed to receive a larger body of lime and thus better lute or cover the opening than if the sides of the screen were formed straight and parallel to each other.

In the said drawing, A, B, C, and D are four bars, constituting the frame of the screen; *a* and *b*, cross bars, which may be used in large screens whenever it may be desirable. *d d*, &c., denote the series of wooden bars or rods which are disposed at the desired distances apart and extend either longitudinally or transversely across the frame, and have their ends projecting beyond the outer face of the frame and in line with the ends of the projecting tenons $c$ $c^1$ $c^2$ $c^3$, or the extended ends $e$ $e^1$ $e^2$ $e^3$, of the frame. By such construction of the rods and the frame with the extended tenons and projecting ends, should the screen be too large for the box for which it is intended, one or both ends of the rods and the frame may be sawed off so as to fit the box. Each of the sides of the frame is to have a bevel, groove, or rabbet, $f$, formed on its upper and lower portions, so that when the screens are placed in the box side by side the openings left between the bars for the passage of the gas (having their larger base upward) shall have a flaring shape, so as to better receive and hold the mass of lime than if the bars were unprovided with such reductions. The screen is so constructed as to be reversible, either side being used uppermost, as may be desirable.

From the above it will be seen that by my peculiar construction and arrangement of parts I produce not only a simple, strong, and durable screen, but one which can readily have its rods removed and others substituted in place thereof whenever it may be desirable, while at the same time I effect a more even and perfect distribution of the lime, whereby a better filtration of the gas is attained.

Having described my invention, what I claim is—

1. The improved gas-screen, as described, the same consisting of the frame A B C D and the series of detachable bars *a a*, &c., constructed, arranged, and combined together in manner as hereinbefore set forth.

2. A gas-screen of the kind described, having its frame beveled, grooved, or rabbeted, in manner and for the purpose set forth.

EDWARD DUFFEE.

Witnesses:
F. P. HALE,
A. J. TILTON.